Patented Oct. 3, 1939

2,174,674

UNITED STATES PATENT OFFICE 2,174,674

PLASTICIZED COMPOSITION

Herbert A. Winkelmann, Chicago, Ill., assignor to Marbon Corporation, Chicago, Ill., a corporation of Delaware No Drawing. Application December 21, 1936, Serial No. 117,001

2 Claims. (Cl. 260—111)

This invention relates to plastic and coating compositions and, more particularly, relates to such compositions comprising a halogen containing rubber derivative and a plasticizer therefor.

The halogen containing rubber derivatives such as chlorinated rubber, rubber hydrochloride, chlorinated rubber hydrochlorides and vulcanized rubber hydrochlorides are suitable for use in coating and plastic compositions and for some purposes do not require modifying agents. For many purposes, however, it is highly advantageous to use these substances in connection with a plasticizer, i. e., a substance of negligibly low volatility and which dissolves or is dissolved by the halogen containing rubber derivative to render the composition less brittle and more supple than it would otherwise be.

All the halogen containing rubber derivatives are not affected the same by plasticizers. In general the chlorinated rubber are readily plasticized by a large number of materials, the amorphous rubber hydrochlorides are also readily plasticized, the crystalline saturated rubber hydrochlorides, particularly the highly insoluble type, are more difficult to plasticize and the vulcanized rubber hydrochlorides in general the most difficult of all.

I have discovered that the phthalyl glycollates and the glycol phthalates are, in general, good plasticizers for all the halogen containing rubber derivatives including the vulcanized rubber hydrochlorides. It has been found that the glycollates and phthalates are compatible with the halogen containing rubber derivatives, at least to a degree sufficient for the amount of plasticizer that it would ordinarily be desirable to employ, and are practically non-volatile at ordinary atmospheric pressures and temperatures.

In carrying out the invention the plasticizer may be incorporated with the halogen containing rubber derivative by milling, rolling or working the materials together in the absence of volatile solvents and in the presence of magnesium oxide or other basic stabilizer such as described in Winkelmann Patent No. 2,046,986. Alternatively the materials may be incorporated with the aid of a quantity of a mutual volatile solvent. Moreover the materials may be incorporated in the rubber prior to reaction with the halogen or hydrohalogen.

The glycollates and phthalates which are suitable plasticizers include butyl phthalyl butyl glycollate, ethyl phthalyl ethyl glycollate, methyl phthalyl ethyl glycollate, dimethyl diethylene glycol diphthalate, dibutyl glycol diphthalate, dimethyl triethylene glycol diphthalate, dimethyl glycol diphthalate. A particularly suitable compound for plasticizing vulcanized rubber hydrochloride is methyl phthalyl ethyl glycollate. All the compounds within this class of phthalyl glycollates and glycol phthalates are practically non-volatile at ordinary atmospheric temperature and pressure, are sufficiently compatible with the halogen containing rubber derivatives to serve as plasticizers, and are readily incorporated in plastics.

The proportion of these plasticizers to be incorporated with the halogen containing rubber derivative will depend, of course, to a large extent on the properties desired in the resulting composition and on the nature of the halogen containing rubber derivative. Preferably the plasticizer will be present in from about 10 to 50% by weight of the amount of halogen containing rubber derivative present. Where great pliability is desired the proportion may be from 50 to 100%.

The alkyl phthalyl alkyl glycollates and the alkyl glycol phthalates are particularly valuable plasticizers for vulcanized rubber hydrochlorides. The hot vulcanization of rubber hydrochlorides with minor proportions of sulfur and accelerator produces a relatively soft, elastic, flexible composition which, however, has a slight tendency to "set up" or harden with age. The alkyl phthalyl alkyl glycollates and the alkyl glycol phthalates have the important property of not deleteriously effecting the vulcanization of rubber hydrohalides when present in the rubber hydrohalide-sulfur composition, and of plasticizing the vulcanized rubber hydrochlorides so that they will remain soft and supple. These properties are present in only a few out of a large number of nonvolatile organic materials tested.

In order to illustrate the invention, the following examples are given, parts being by weight:

EXAMPLE I

Coating and casting compositions

| Ingredients | Parts by weight | | | | |
|---|---|---|---|---|---|
| Amorphous rubber hydrochloride (29% chlorine) | 10 | 10 | 10 | 10 | 10 |
| Methyl phthalyl ethyl glycollate | 1 | 2 | 4 | 6 | 10 |
| Toluol | 100 | 100 | 100 | 100 | 100 |

EXAMPLE II

Coating composition

| Ingredients | Parts by weight | | | | | |
|---|---|---|---|---|---|---|
| Chlorinated rubber (60% chlorine) | 20 | 20 | 20 | 20 | 20 | 20 |
| Methyl phthalyl ethyl glycollate | 5 | 8 | 10 | 13 | 15 | 20 |
| Xylol | 80 | 80 | 80 | 80 | 80 | 80 |

EXAMPLE III

Molded composition (vulcanized rubber hydrochloride)

| Ingredients | Parts by weight | | | | |
|---|---|---|---|---|---|
| | DP-34 | DP-62 | DP-69 | DP-106 | DP-1 |
| Rubber hydrochloride of viz. 31% chlorine | 64.8 | 57.0 | 56.8 | 87.0 | 64.8 |
| Magnesium oxide | 6.5 | 5.6 | 5.5 | 8.7 | 6.5 |
| Litharge (PbO) | 9.7 | 9.5 | 9.2 | 13.1 | 6.4 |
| Butyl aldehyde aniline | 3.2 | 2.8 | 2.8 | 2.0 | 3.2 |
| Sulfur | 4.5 | 3.9 | 3.9 | 3.0 | 4.5 |
| Thermax | | 10.6 | 10.6 | 16.6 | 10.6 |
| Methyl phthalyl ethyl glycollate | 10.8 | | | | |
| Dimethyl diethylene glycol diphthalate | | 12.1 | | | |
| Dibutyl glycol diphthalate | | | 12.1 | | |
| Dimethyl triethylene glycol diphthalate | | | | 18.9 | |
| Cumar (P-25) | | | | | 3.5 |

The above ingredients were milled and fluxed into an intimate mixture and then molded and cured at 287° F. for twenty to sixty minutes. Tensile, modulus at 300% elongation, hardness and elongation tests on the molded products cured at 287° F. for forty minutes are given in the table.

TABLE

| Composition | Modulus at 300% | Tensile | Set | P. & J. | Shore | Elongation |
|---|---|---|---|---|---|---|
| DP-34 | 160 | 1750 | 50 | 78 | 69 | 810 |
| DP-62 | 360 | 1760 | 50 | 74 | 70 | 775 |
| DP-69 | 390 | 1670 | 46 | 68 | 65 | 710 |
| DP-106 | 800 | 2400 | 33 | 29 | 81 | 630 |
| DP-1 | 830 | 2710 | 48 | 25 | 93 | 645 |

The preparation of other vulcanized rubber hydrochloride compositions is described in detail in my copending application Ser. No. 22,431 filed May 20, 1935.

I claim:

1. A composition adapted to be vulcanized and molded or otherwise shaped by heat and pressure in articles of manufacture, said composition comprising a rubber hydrochloride, vulcanizing and hydrochloric acid neutralizing ingredients, and a plasticizer for said rubber hydrochloride selected from the group consisting of phthalyl glycollates and glycol phthalates, said plasticizer being present in amount of from about 10% to 100% by weight of the rubber hydrochloride.

2. A composition adapted to be vulcanized and molded or otherwise shaped by heat and pressure in articles of manufacture, said composition comprising a rubber hydrochloride, vulcanizing and hydrochloric acid neutralizing ingredients, and from about 10% to 100% by weight of methyl phthalyl ethyl glycollate on the rubber hydrochloride.

HERBERT A. WINKELMANN.